United States Patent
Vincent et al.

(10) Patent No.: US 12,384,898 B2
(45) Date of Patent: Aug. 12, 2025

(54) METHOD FOR PRODUCING AN EXPANDED RIGID FOAM WITH SEALED PORES

(71) Applicant: INSTITUT MINES TELECOM, Palaiseau (FR)

(72) Inventors: Thierry Vincent, Allegre les Fumades (FR); Eric Guibal, Deaux (FR)

(73) Assignee: INSTITUT MINES TELECOM, Palaiseau (FR)

( * ) Notice: Subject to any disclaimer, the term of this patent is extended or adjusted under 35 U.S.C. 154(b) by 854 days.

(21) Appl. No.: 17/442,454

(22) PCT Filed: Mar. 26, 2020

(86) PCT No.: PCT/EP2020/058485
§ 371 (c)(1),
(2) Date: Sep. 23, 2021

(87) PCT Pub. No.: WO2020/193682
PCT Pub. Date: Oct. 1, 2020

(65) Prior Publication Data
US 2022/0162413 A1    May 26, 2022

(30) Foreign Application Priority Data
Mar. 26, 2019  (FR) ..................... 19/03151

(51) Int. Cl.
| | | |
|---|---|---|
| C08J 9/04 | (2006.01) | |
| C08J 9/00 | (2006.01) | |
| C08J 9/14 | (2006.01) | |
| C08J 9/36 | (2006.01) | |

(52) U.S. Cl.
CPC ......... *C08J 9/0061* (2013.01); *C08J 9/0066* (2013.01); *C08J 9/0085* (2013.01); *C08J 9/142* (2013.01); *C08J 9/36* (2013.01); *C08J 2205/052* (2013.01); *C08J 2205/10* (2013.01); *C08J 2305/04* (2013.01); *C08J 2429/04* (2013.01)

(58) Field of Classification Search
CPC ...... C08J 9/0061; C08J 9/0066; C08J 9/0085; C08J 9/142; C08J 9/36; C08J 2205/052; C08J 2205/10; C08J 2305/04; C08J 2429/04; C08J 2305/00; C08J 2207/00; C08J 9/30; C08J 9/0052
See application file for complete search history.

(56) References Cited

U.S. PATENT DOCUMENTS

| | | | |
|---|---|---|---|
| 3,334,052 A | 8/1967 | Kurz et al. | |
| 6,589,328 B1 | 7/2003 | Nussinovitch | |
| 2005/0137272 A1* | 6/2005 | Gaserod | C08L 5/04 521/50 |
| 2006/0020049 A1* | 1/2006 | Champ | B01J 20/26 521/99 |
| 2009/0010983 A1* | 1/2009 | Melvik | A61L 27/52 435/402 |

FOREIGN PATENT DOCUMENTS

| | | | | |
|---|---|---|---|---|
| EP | 0537999 A2 | 4/1993 | | |
| EP | 747420 A1 * | 12/1996 | ............. | A61L 15/28 |
| GB | 560317 A | 3/1944 | | |

OTHER PUBLICATIONS

May 8, 2020 International Search Report issued in International Patent Application No. PCT/EP2020/058485.
Sep. 28, 2021 International Preliminary Report on Patentability issued in International Patent Application No. PCT/EP2020/058485.

* cited by examiner

*Primary Examiner* — K. Boyle
(74) *Attorney, Agent, or Firm* — Oliff PLC (57) ABSTRACT

A method for producing an expanded rigid foam with sealed pores includes at least the following steps: a) a mixture is prepared containing at least: an anionic polymer suited for ionotropic gelation; a foaming agent; a source of multivalent cations, said multivalent cations not being released in the mixture a); and a solvent; b) the mixture is stirred so as to obtain a foam; c) a compound capable of releasing protons in a sufficient amount to release said multivalent cations is added to the foam such that the anionic polymer gels ionotropically; d) the foam is dried. A foam is obtained in this manner and an object (for example a package, a heat-insulating or flame-retardant material) is made from this foam.

15 Claims, 4 Drawing Sheets

METHOD FOR PRODUCING AN EXPANDED RIGID FOAM WITH SEALED PORES

The invention concerns a method for producing an expanded rigid foam with sealed pores, having heat-insulation, flame-retardant and compressive strength properties at the same time.

Expanded polystyrene (hereinafter abbreviated as «EPS») is a synthetic insulation material perfectly known for its heat-insulation, mechanical strength and low density properties However, its fireproof properties are not fully satisfactory and its life cycle is merely virtuous.

That is why, the scientific community and the industrialists of the sectors related to this product family look for new materials as alternative to EPS which would combine the advantages of being environmentally friendly and of having better fireproof properties, while keeping interesting heat-insulation and mechanical capabilities.

Biosourced materials are promising materials to meet these conditions.

By «biosourced material», it should be understood, in the context of the present invention, a material that is almost totally or partially produced from biologically-derived matters and from non-toxic compounds (for example minerals). The synthetic products (mainly the foaming agent) represent less than 1% of the final dry weight.

The inventors of the present invention have developed a method for producing a foam with sealed pores having a low density which perfectly meets these objectives, namely said foam has a virtuous life cycle and whose insulation, fire-resistant and compressive strength properties are at least equal to those of known materials, such as EPS. In addition, the production method is energy-efficient while minimizing the use of products that are toxic to the environment and the operators.

The document U.S. Pat. No. 6,589,328B1 describes a method for producing a biodegradable foam intended in particular for the industry of absorbent hygiene products or the agri-food industry as an edible matrix. This foam is produced from a polymer gel such as an alginate. The alginate is mixed with a source of calcium ions, with calcium carbonate and with an acid. The latter induces both the release of calcium from the source of calcium, allowing gelling the alginate, and the release of carbon dioxide bubbles from the calcium carbonate, thereby generating an internal porosity within the gel. Afterwards, the produced foam is dried by lyophilization.

The document EP053799A2 describes a viscous foam intended to treat polluted sites or surfaces to create an insulating barrier with regards to contaminants. It is prepared from an aqueous solution of a polysaccharide adapted to gel, a complexing agent and a foaming agent into which air is blown. Afterwards, the gel foamed in this manner is applied while it is wet, over a material or at the surface of a liquid in order to limit the evaporation or the dispersion of toxic, and possibly flammable, products.

The present relates to quite another field. The inventors have developed a material in the form of an expanded rigid foam with sealed pores, which is biosourced, which has a heat-insulation and fire-retardant capability, and whose compressive strength qualities are also remarkable.

These properties make this a material that finds applications in many fields, and in particular in building, the foam of the invention could be obtained in the form of panels with large surfaces, for example in the range of 0.5 m², or more, but also in packages or decoration, the foam of the invention could be molded as desired.

Thus, an object of the invention is a method for producing an expanded rigid foam with sealed pores which comprises at least the following steps:
a) a mixture is prepared containing at least:
  an anionic polymer suited for ionotropic gelation;
  a foaming agent;
  a source of multivalent cations, said multivalent cations not being released in the mixture a); and
  a solvent;
b) the mixture is stirred so as to obtain a foam;
c) at least one compound capable of releasing protons in a sufficient amount to release said multivalent cations is added to the foam obtained on completion of step b) such that the anionic polymer gels ionotropically;
d) the foam obtained on completion of step c) is dried so as to obtain said expanded rigid foam with sealed pores.

According to an implementation of the method, if the foam is not directly dried on completion of step c), after step c) and before step d), the foam is casted into a mold. The latter is adapted to the desired shape of the rigid foam produced in this manner.

During step c), when the compound capable of releasing protons in a sufficient amount to release said multivalent cations is added to the foam, the multivalent cations released in this manner interact with the anionic polymer within its electronegative cavities such that the polymer gels ionotropically.

Thus, during this step c), the compound capable of releasing protons is the trigger of the ionotropic gelation of the anionic polymer. According to the invention, the gelation conditions are activated only after the foaming step.

In other words, the present invention is based on the combined action of the source of multivalent cations which is inactive in the mixture a) as said anionic polymer of the mixture a) is not in contact with said multivalent cations, with the foaming agent which will cause an increase in the volume of the mixture a) by foaming, and with the compound capable of releasing protons at step c) which will cause the exposure of said anionic polymer to said multivalent cations and thus cause the ionotropic gelation.

The method of the invention produces a rigid structured foam whose volume could amount up to 5 times the volume of the mixture a), and more and which has the aforementioned heat-insulation and fireproof and compressive strength properties. It allows implementing mixtures, which could be very viscous, a high concentrations of anionic polymer, for example from 2 to 4 weight % of alginate, over operating time periods perfectly compatible with casting into the drying mold.

Advantageously, the mixture a) further comprises at least one sequestering agent with regards to the cations and in particular the multivalent cations. At step c), the sequestering agent will interact with the released cations, and thus slow down the rate of gelation of the anionic polymer which will take place in a controlled manner with the excess multivalent cations.

This has the advantages of obtaining, on completion of step c), a foam that is perfectly homogenous and which could be easily shaped in a mold, and that being so with a regular surface and without any heterogeneity.

Furthermore, this increases the duration of casting the foam. Indeed, the duration of casting the foam is comprised between 5 min and 20 min, preferably in the range of 10 minutes.

More specifically, the presence of a sequestering agent in the mixture of step a) allows slowing down the availability of the multivalent cations and slowing down the overall process of ionotropic gelation of the anionic polymer. This control of the gelation rate leads to a better processability of the reactive mixture and more particularly facilitates casting of the foam into a mold.

The principle of the production method of the present invention is based on gelling the anionic polymer in the presence of multivalent cations after having foamed it. A direct addition of multivalent cations would lead to the non-structured formation of flocs which do not allow obtaining a homogeneous, light and mechanically stable foam. That is why it is important to gel said anionic polymer homogeneously and progressively after foaming. This action is achieved through the progressive release of the multivalent cations by the effect of slow dissociation of the compound capable of releasing protons.

Advantageously, the source of multivalent cations and the compound capable of releasing protons are added, respectively at steps a) and c), in the solid state in order to better manage the progressivity of release of the multivalent cations and the ionotropic gelation of the anionic polymer.

Said anionic polymer suited for anionic gelation is a polymer that is naturally anionic or made anionic by chemical modification. Thus, it could be selected from alginates (for example sodium alginate), kappa and iota carrageenans, pectins, starch and derivatives thereof (for example sodium carboxymethyl starch or starch sodium octenyl succinate), cellulose carboxymethyl, dextrane sulfate, xanthan, chondroitin sulfate, hyaluronate, N-acyl chitosans (for example carboxymethyl chitosan), acrylic polymers, methacrylic polymers, polylactic polymers, polyglycolic polymers, copolymers of acrylic and methacrylic acid, proteins and carbomers. Among these polymers, some are not naturally anionic, but are available in the market and easily accessible in a modified form, in particular chemically modified, so as to be anionic. The mixture of step a) may comprise at least one of these anionic polymers. Said anionic polymer may be used alone or in a mixture of several ones of these.

Preferably, the anionic polymer suited for ionotropic gelation is selected from biosourced polymers. This has the advantage of obtaining a foam whose life cycle is environmentally friendly.

Preferably, it consists of sodium alginate.

The multivalent cations present in the mixture a) are in the form of a source of said multivalent cations which does not enable or does not essentially enable the release in the mixture a). It is only in contact with said compound capable of releasing protons at step c) that these will be released. Advantageously, they are released by solubilization. Thus, the source of these cations is preferably selected from compounds that solubilize at acid pH at step c) after addition of the compound capable of releasing protons, and which are merely soluble at a neutral pH, that of the mixture a). Hence, it should be dissociated in an acid medium to release a multivalent cation that will interact afterwards with some functions of the anionic polymer suited for ionotropic gelation.

This source of multivalent cations may consist of a salt. For example, it may consist of calcium, iron, strontium, barium, chromium, manganese, cobalt, nickel, molybdenum, copper, aluminum and zinc salts. It may consist of a salt selected from calcium carbonate, calcium sulfate, calcium citrate, calcium fluoride, calcium glycerophosphate, calcium hydroxide, calcium oxalate, dibasic calcium phosphate (or calcium hydrogen phosphate), monobasic calcium phosphate, tribasic calcium phosphate, calcium pyrophosphate, calcium saccharate, calcium succinate, and calcium tartrate. The source of multivalent cations may comprise at least one of these salts. Said salt may be used alone or in a mixture of several ones of these.

In an embodiment of the invention, the anionic polymer is a sodium alginate and the source of multivalent cations is calcium carbonate. During the ionotropic gelation of step c), part of the carboxylate functions of the alginate that might belong to different macromolecular chains are complexed by the cations $Ca^{2+}$.

As explained hereinabove, the compound capable of releasing protons in a sufficient amount to solubilize said multivalent cations is intended to control the progressive release of the multivalent cations such that the anionic polymer gels homogeneously.

Advantageously, this compound consists of a slow-dissociation weak acid.

This compound may be selected from lactones of carboxylic acid and boric acid which may be considered alone or in a mixture of several ones of these.

Preferably, it consists of glucono-delta-lactone.

Advantageously, the compound capable of releasing protons is added, at step c), in a solid form. In this form, it allows activating the gelation progressively, as it is dissolved, thereby contributing to a greater homogeneity of the structure of the foam. Preferably, it is in the form of a powder whose particles have a grain-size distribution ranging from 125 µm to 500 µm.

Furthermore, as explained hereinabove, the sequestering agent allows stopping the availability of the multivalent cations and slowing down the overall process of ionotropic gelation of the anionic polymer.

The sequestering agent may be selected from sodium hexametaphosphate, polyphosphates and sodium or potassium phosphate (or trisodium phosphate). The sequestering agent may be considered alone or in a mixture of several ones of these.

Preferably, it consists of sodium hexametaphosphate.

The foaming agent has foaming emulsifying properties. It allows foaming the anionic polymer suited for ionotropic gelation and more generally the mixture a), leading to an increase in the volume of the mixture a). The increase coefficient depends primarily on the viscosity of the mixture a), it varies inversely with viscosity, the higher the latter is, the weaker it will be and the denser the produced rigid foam will be. Thus, the volume of a mixture a) with a viscosity in the range of 1,000-5,000 cP (at 20° C.) may increase by a factor of 5, and more, generally in the range of 2 to 4. For example, for a viscosity of the mixture a) in the range of 3,500 cP, a factor of 3 is easily reached. The foaming agent may be selected from anionic or non-ionic surfactants, it is preferably anionic.

Advantageously, the foaming agent has no interaction with the multivalent cations so as not to affect the release thereof so they could be chelated in the electronegative cavities of the anionic polymer suited for ionotropic gelation.

The foaming agent may be selected from anionic foaming agents such as sodium lauryl sulfate, ammonium lauryl sulfate, sodium stearate and sodium dodecylbenzenesulfonate and non-ionic foaming agents such as polysorbates. The foaming agent may be considered alone or in a mixture of several ones of these.

Preferably, it consists of sodium lauryl sulfate.

The duration of foaming at step b) is unlimited, preferably it varies from a few minutes, for example from at least 2 minutes, preferably at least 10 minutes, to a few hours for example up to 2 hours. These values are given only for strictly illustrative purposes.

Optionally, the mixture of step a) may comprise at least one charge. Said charge is not charged or negatively charged in order not to interact with the anionic polymer suited for the ionotropic gelation. Preferably, the charge is in the form of particles having a size smaller than 250 μm.

This charge may be selected from:
- activated carbon;
- clays (for example bentonite, vermiculite);
- titanium dioxide;
- silica;
- cork;
- plant barks (for example finely crushed citrus barks); and
- colorants, preferably pigments (and more preferably dietary and non-toxic pigments).

In the mixture of step a), this charge could be used alone or in a mixture of several ones of these.

The activated carbon may be used as a charge for capturing odors, toxic gaseous molecules or for coloration (namely obtaining a gray to black foam, depending on the added amount of activated carbon).

The selection of suitable colorants allows conferring aesthetic effects and a visual aspect as desired on the foam obtained with the production method. Indeed, depending on the desired visual aspect of the foam, those skilled in the art perfectly know how to determine, possibly using routine tests, the colorants and their amounts to be added to the mixture throughout the process of producing the foam.

The mixture may further comprise at least one mechanical reinforcing agent. This agent will enhance the mechanical strength of the foam obtained with the method according to the invention.

In an embodiment of the invention, at step b), at least one mechanical reinforcing agent is added to the mixture.

This mechanical reinforcing agent may consist of fibers. For example, it consists of cellulose, wood, hemp, silk, cotton, coco, textile (in particular used textiles) or linen fibers. These charges may be considered alone or in a mixture of several ones of these.

Preferably, the fibers are added during step b) in order not to disturb foaming of the mixture prepared at step a).

Advantageously, the fibers have been hydrated before incorporation thereof in the mixture so as to mix them in a more intimate manner with the other constituents of the mixture while avoiding the formation of agglomerates.

The charges may consist of wastes, in particular wastes of agri-food industries (for example plant barks) or textile wastes (for example used textile fibers). Thus, the method according to the invention has the advantage of using wastes.

The charges and mechanical reinforcing agents are adequately selected according to the desired properties of the foam obtained with the production method. These properties may consist of colorations, mechanical properties or flame-retardant properties. Of course, those skilled in the art knows the properties that are obtained depending on the charges and mechanical reinforcing agents that are added throughout the production process (for example the charges and mechanical reinforcing agents detailed hereinabove). That is why it is within the reach of those skilled in the art to select and add at steps a) and/or b) of the production method according to the invention the charges and mechanical reinforcing agents required for the desired properties of the foam obtained with this method.

Advantageously, the mixture of step a) comprises a stabilizing agent. This agent allows stabilizing (in other words «fixing») the foam throughout the process until gelation. The stabilizing agent allows obtaining a very homogeneous foam, having smaller closed cells than the foam that would be obtained in the absence of this stabilizing agent, and with substantially identical sizes. In other words, the stabilizing agent allows also modulating the density of the foam obtained with the production method.

This stabilizing agent may be selected from polyvinyl alcohol, gelatin and soya lecithin.

Advantageously, the solvent that the mixture of step a) comprises consists of water. It may consist of bipermuted water or still tap water as long as its hardness is not too high, meaning it has a low concentration of calcium and magnesium that cannot excessively gel the anionic polymer. For example, the water may have a hydrotimetric title lower than 15° F. («° F.» meaning «French degrees»). The solvent may also consist of an aqueous solvent, that is to say an aqueous mixture of a water-soluble solvent. Its amount will be determined essentially according to the desired viscosity of the mixture a). This viscosity is a parameter that those skilled in the art will adjust according to the density of the expected rigid foam (1), but also according to the step of casting the foam should this occurs, the denser (or firmer) is the foam, the less easy casting will be.

The mixture may comprise, in weight percent expressed with respect to the total mass of said mixture:
- between 0.77% and 4.6%, preferably between 2% and 3.5%, of the anionic polymer suited for ionotropic gelation;
- between 0.02% and 0.08%, preferably between 0.04% and 0.06%, of the foaming agent;
- between 0.1% and 3%, preferably between 0.2% and 0.4%, of the source of multivalent cations;
- q.s. 100% of solvent,
- «q.s.» being the abbreviation of «Quantum Satis» and means that the solvent shall be added in the mixture in a sufficient amount so that the sum of the weight percentages of the constituents of the mixture is equal to 100.

Optionally, the mixture may further comprise:
- between 0.00005% and 0.001%, preferably between 0.0001 and 0.0005% of the sequestering agent, and/or
- between 0.02% and 0.15%, preferably between 0.05% and 0.08%, of the stabilizing agent; and/or
- between 0.05% and 8%, preferably between 0.1% and 1.5%, of the charge; and/or
- between 0.05% and 8%, preferably between 0.1% and 1.5%, of the mechanical reinforcing agent.

Step b) is carried out by stirring the mixture at a rate comprised between 40 and 150 rpm, preferably between 60 and 90 rpm.

Stirring may be carried out for a time period comprised between 5 and 120 minutes, for example between 20 and 60 minutes, and in average between 25 and 30 minutes.

Step b) is carried out until obtaining a foam.

Advantageously, step b) is carried out at room temperature, namely at a temperature that may be comprised between 15° C. and 25° C., preferably at about 20° C.

The weight percentage of the compound capable of releasing protons in a sufficient amount to solubilize the multivalent cations which is added to the foam at step c) may be comprised between 2 and 5 times, preferably between 2.5 and 3.5 times, the weight percentage of the source of divalent cations which has been added to the mixture.

Steps a) to c) of the method according to the invention may be carried out in a paddle mixer.

The foam obtained on completion of step c) may be casted into a mold so as to confer a desired shape thereon.

Preferably, the drying step d) is carried out in an oven. The drying temperature may be comprised between 30° C. and 60° C. Advantageously, the drying temperature is 40° C. The drying duration may be comprised between 3 days (at 60° C.) and 8 days (at 30° C.). Advantageously, the drying duration is 5 days (at 40° C.).

In a particularly interesting embodiment of the invention, upon completion of drying, the foam may be postformed. This postforming may be easily carried out, for example, by rehydrating the foam so that it loses its rigidity and is thus malleable and by disposing it in a mold that confers another shape thereon.

The foam obtained with the production method according to the invention has a matrix with sealed pores. In other words, the foam has closed cells.

The expanded rigid foam with sealed pores obtained with the production method according to the invention may have at least one, or several ones an even all, of the following properties:
- a density comprised between 25 and 50 kg/m$^3$;
- a Young's modulus comprised between 2 and 5 MPa;
- a thermal conductivity comprised between 0.03 and 0.05 W/m·K;
- a mass heat capacity comprised between 1.4 and 1.7 J/g·°C.;
- a fire behavior in the V-0 or V-1 classes determined according to the standard UL 94 (namely the standard for classification of flammability of plastic materials);
- a compressive strength of 0.2 MPa or more.

At step b), foaming or expansion (which could be carried out under strong stirring) creates an emulsion which allows trapping air bubbles in the polymer matrix. At the gelation step c), the polymer matrix freezes and keeps the air bubbles trapped. These cells lead to the formation of sealed pores of the foam which contributes in particular to the insulation properties thereof.

As explained hereinabove, in the case where the anionic polymer is a biosourced polymer, the foam obtained with the method according to the invention has the advantage of being a biosourced material. Indeed, between 97% and 98% of its constituents is represented by a biopolymer, these weight percentages being expressed with respect to the total dry weight of said foam; the other constituents are non-toxic compounds.

The expanded rigid foam with sealed pores obtained with the production method which is an element of the invention, may be used for different applications such as in particular packages, horticultural containers, decorative objects, insulating, in particular heat-insulating, materials and flame-retardant materials. A foam of the invention has excellent mechanical properties, and in particular a compressive strength that could reach 0.2 MPa, and more.

Thus, the invention also concerns an object that is totally or partially made with the expanded rigid foam with sealed pores obtained according to the production method according to the invention as described hereinabove. Such an object could be produced directly on completion of the method by casting and then drying. It could be produced by postforming a foam obtained according to the method of the invention; for this purpose, the foam is rehydrated until becoming soft, malleable so as to be molded in a suitable mold and then dried.

Said object may be selected from packages, horticultural containers, decorative objects, insulating materials and flame-retardant materials.

The invention will be better understood from the detailed description of the examples that are disclosed hereinbelow with reference to the appended figures representing results of experimental data relating to the production method according to the invention.

Experiments have been carried out on foams obtained according to the production method and on comparative foams.

EXAMPLE 1: PREPARATION OF A FOAM ACCORDING TO THE METHOD OF THE INVENTION AND ILLUSTRATION OF ITS HEAT-INSULATION PROPERTIES

A mixture containing the following compounds has been prepared:
- 80 g of bipermuted water;
- 400 g of a sodium alginate solution at 4 weight %;
- 5 g of a polyvinyl alcohol solution at 10 weight %;
- 15 mL of a calcium carbonate suspension at 10 weight %;
- 0.1 mL of sodium hexametaphosphate at 5 weight %;
- 20 mL of a sodium lauryl sulfate at 1 weight %.

The mixture has been stirred in a mixer with whip-type paddles with 8 branches commercialized by the company Kenwood under the commercial name Cooking Chef for 18 minutes at a speed of 80 rpm and at a temperature of 20° C. A foam has been obtained.

At the 18$^{th}$ minute, 8 g of glucono-delta-lactone have been added to the mixture. Stirring of the foam has been carried on for 2 minutes.

The foam has been casted in a polypropylene mold which has been disposed afterwards in an oven set at 40° C., for 5 days.

The foam obtained in this manner had a density of 43 kg/m$^3$.

The heat-insulation capability of this gelled foam has been determined. For this purpose, two cylindrical-shaped glass vials with a 500 mL volume have been half-filled with warm water at 90° C. and closed using a plastic plug. One amongst the vials has been inserted in a pot made of the foam. In each vial, a probe measured the evolution of the temperature over time.

Figure 1:
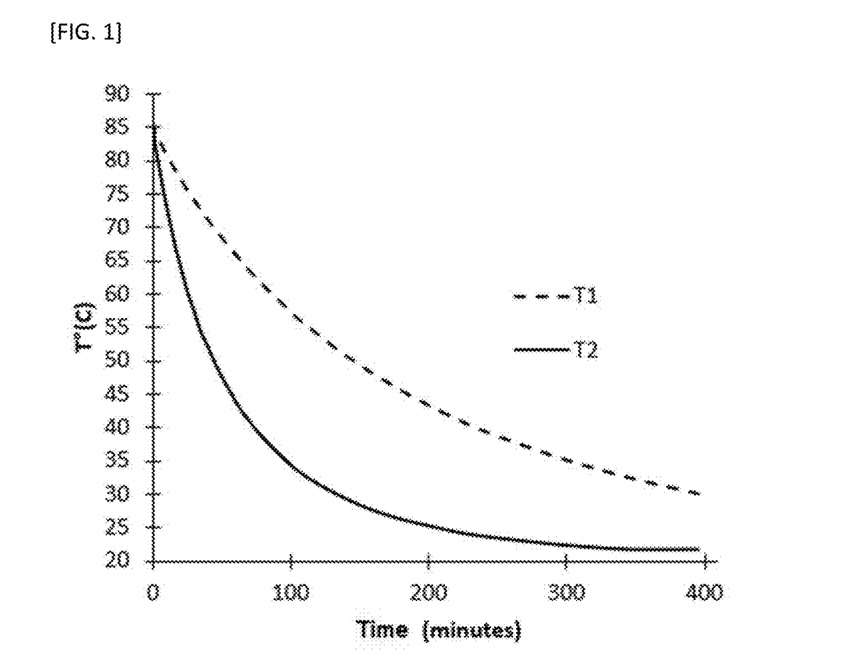
FIG. 1 represents a graph of the evolution of the temperatures measured within two glass vials filled with warm water one of which has been inserted in a pot made of a foam obtained according to the production method of the invention.

FIG. 1 is a graph of the evolution of the temperatures measured within two vials over time:
  within the vial inserted in a foam pot (the upper curve denoted «T1»);
  within the $2^{nd}$ vial (the lower curve denoted «T2»).

The appearance of the two curves demonstrates the heat-insulation properties obtained with a foam obtained with the manufacturing method according to the invention. Indeed, the vial inserted in a pot made of a foam according to the invention cools down more slowly over time than the $2^{nd}$ vial.

EXAMPLE 2: PREPARATION OF A FOAM ACCORDING TO THE METHOD OF THE INVENTION AND ILLUSTRATION OF ITS FIRE-RESISTANT PROPERTIES

A mixture containing the following compounds has been prepared:
  150 g of bipermuted water;
  10 g of orange barks;
  400 g of a sodium alginate solution at 4 weight %;
  5 g of a polyvinyl alcohol solution at 10 weight %;
  15 mL of a calcium carbonate suspension at 10 weight %;
  0.1 mL of sodium hexametaphosphate at 5 weight %;
  20 mL of a sodium lauryl sulfate at 1 weight %.

The mixture has been stirred in the same mixer as that of Example 1 over 18 minutes at a speed of 80 rpm and at a temperature of 20° C. A foam has been obtained.

At the $18^{th}$ minute, 8 g of glucono-delta-lactone have been added to the mixture. Stirring of the foam has been carried on for 2 minutes.

Afterwards, the foam has been casted in a polypropylene mold which has been disposed afterwards in an oven set at 40° C., for 5 days.

The fire behavior of this foam has been compared with that of the following two foams:
  a $1^{st}$ comparative polystyrene foam commercialized by the company BASF under the commercial name STYRODUR®;
  a $2^{nd}$ comparative polyurethane foam commercialized by the company SOPREMA under the commercial name EFIGREEN® ALU+ from which the outer aluminum film has been removed, in order to keep only the polyurethane core that includes a flame retardant.

The fire behavior of the three foams has been studied with a cone calorimeter which is a measuring instrument for fire tests in the laboratory. In particular, it allows measuring for a given material during the combustion thereof:
  the ignition time;
  the mass loss rate;
  the heat output.

The ignition time corresponds to the time after which a continuous flame remains at the surface of the tested material.

The mass loss is characterized as being the variation of mass of the tested sample over time, for a given temperature or temperature profile. The derivative of the mass loss over time corresponds to the mass loss rate.

The cone calorimeter that has been used during this $2^{nd}$ experiment is a test apparatus developed in the NIST (namely the acronym of «National Institute of Standards and Technology»).

The three foams have been subjected to a heat flux of 50 $kW/m^2$, corresponding to a fully developed fire.

Figure 2:
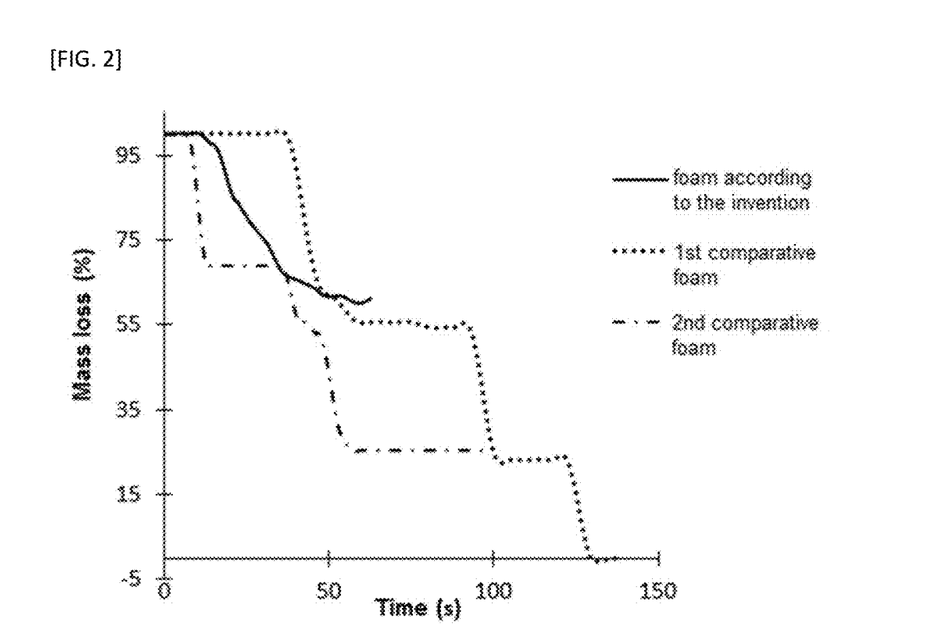
FIG. 2 represents a graph of the evolution over time of the mass loss of a foam according to the invention and of two comparative foams when these are subjected to an irradiation flux of 50 kW/m$^2$ (cone calorimeter).

FIG. 2 represents a graph of the evolution over time of the mass loss of the three foams. The major datum that is obtained is the residues level c at the end of combustion. For the foam according to the invention, this level amounts to 61%. For the $1^{st}$ and $2^{nd}$ comparative foams, this level amounts to 0 and 26%, respectively. These results show that the foam according to the invention has the capability of extinguishing the flame more rapidly than the two comparative foams.

Figure 3:
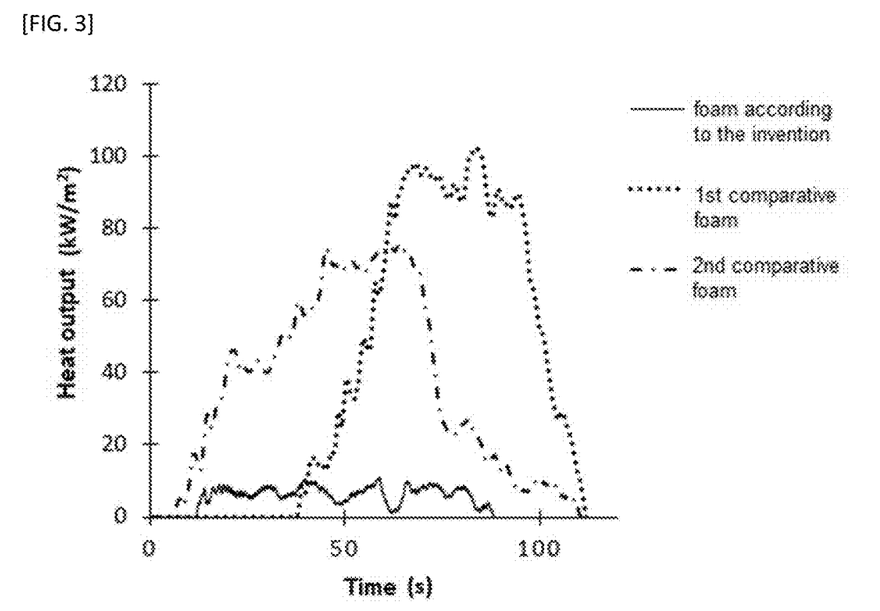
FIG. 3 represents a graph of the evolution over time of the heat output of these three foams.

FIG. 3 represents a graph of the evolution over time of the heat output of the three foams.

It is noticed that the foam according to the invention releases less heat than the two comparative foams. Indeed, the foam according to the invention has a lower heat output peak, as well as a lower total heat output (namely equivalent to the surface area under the curve of the heat output over time) than those of the two comparative foams.

Table 1 details hereinbelow for each of the three foams:
  the ignition time;
  the heat output peak;
  the total heat output;
  the residues level at the end of combustion.

TABLE 1

|  | Ignition time (s) | Heat output peak ($kW/m^2$) | Total heat output (kJ/g) | Residues level at the end of combustion (%) |
|---|---|---|---|---|
| Foam according to the invention | 12 | 17 | 0.6 | 61 |
| $1^{st}$ comparative foam | 38 | 100 | 7.8 | 0 |
| $2^{nd}$ comparative foam | 8 | 80 | 4.5 | 26 |

Table 1 detailing the fire behavior parameters of the three tested foams

In light of the results detailed in Table 1 hereinabove and in FIGS. 2 and 3, the foam according to the invention has good fire properties which could compete with those of the heat-insulating foams known from the prior art such as the $1^{st}$ and $2^{nd}$ comparative foams. Unlike these comparative foams, the foam according to the invention further has the advantage of being free of fireproof chemical additives harmful to the health during the combustion thereof. It should be added that the production of these foams does not incorporate any toxic product (in comparison with the mentioned commercial foams), that these are biodegradable (biodegradability index close to cellulose; i.e., COD/BOD5=chemical oxygen demand/5-day biochemical oxygen demand=1.05, close to that of cellulose). These foams are compostable (including in household composting).

Figure 4:
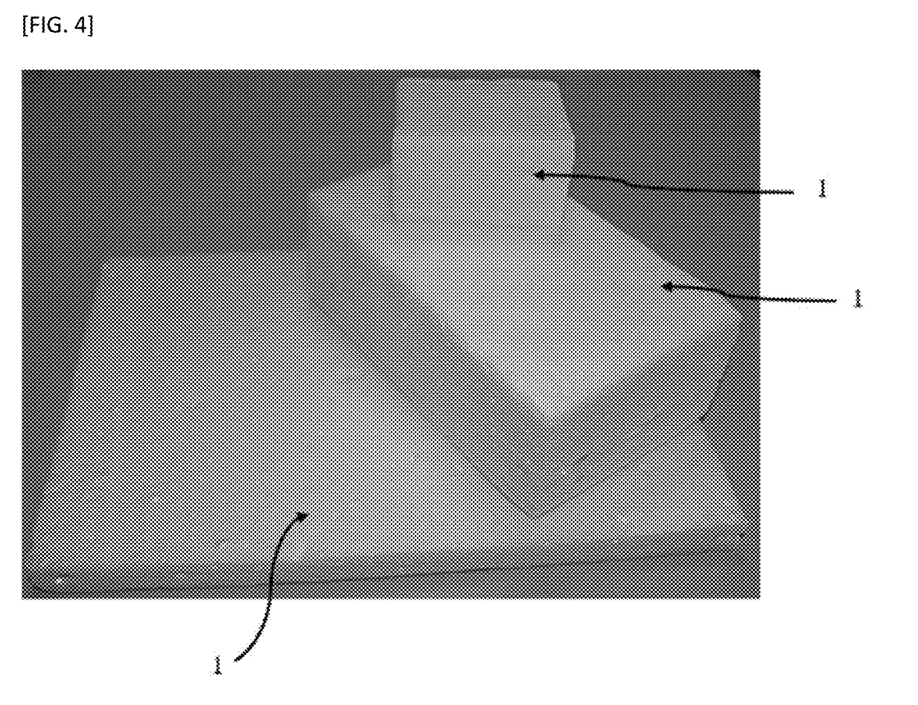
FIG. 4 represents examples of foams obtained with the production method of the invention: plate (30 cm×20 cm×1.5 cm), and assemblies of plates by gluing.

FIG. 4 represents a photograph of 3 objects (plate and 2 blocks with different thicknesses) which have been made from a foam with sealed pores produced according to the operating method of Example 1. The 2 blocks have been obtained by gluing plates of said foam.

EXAMPLE 3: PREPARATION OF A FOAM ACCORDING TO THE METHOD OF THE INVENTION AND ILLUSTRATION OF ITS MECHANICAL PROPERTIES

Experiments covering the assessment of the mechanical properties have been carried out on foams obtained according to the production method of the invention (with the formulations described hereinbelow), as well as on commercial foams for comparison purposes.

A mixture containing the following compounds has been prepared:
- 400 g of bipermuted water;
- 1000 g of a sodium alginate solution at 4 weight %;
- 7.5 g of a polyvinyl alcohol solution at 10 weight %;
- 35 mL of a calcium carbonate suspension at 10 weight %;
- 0.2 mL of sodium hexametaphosphate at 5 weight %;
- 40 mL of a sodium lauryl sulfate at 1 weight %.

The mixture has been stirred in a mixer with whip-type paddles with 8 branches commercialized by the company Kenwood under the commercial name Cooking Chef for 20 minutes at a speed of 80 rpm and at a temperature of 20° C.

At the $20^{th}$ minute, X g of fibers hydrated beforehand (cf. the table hereinbelow detailing the type of fibers as well as the used amounts) are added and stirring is maintained until the $28^{th}$ minute. An expanded foam has been obtained.

At the $28^{th}$ minute, 12.5 g of glucono-delta-lactone have been added to the mixture.

Stirring of the foam has been carried on for 2 minutes.

The foam has been casted in a polypropylene mold which has been disposed afterwards in an oven set at 40° C., for 5 days.

The dry foam obtained in this manner had a density of 40 kg/m³.

| Fibers type (Fibers supplied by the company J.RETTENMAIER & SÖHNE) | Reference | Fibers mass (X, g) | Dimensions of the tested plates | Volumetric mass |
|---|---|---|---|---|
| LIGNOCEL PF (200 à 300 μm) (Wood fibers) | Serie L 10% | 5 g | 1.5 × 10 × 10 cm | 40 kg/m³ |
| ARBOCEL B400 (900 μm) Cellulose fibers | Serie M 10% | 5 g | 1.5 × 10 × 10 cm | 40 kg/m³ |
| Without added fibers | Serie K | 0 g | 1.5 × 10 × 10 cm | 40 kg/m³ |

The mechanical strength tests (compressive stress) of these foams have been compared with those of the following two foams:
- a $1^{st}$ comparative polystyrene foam commercialized by the company BASF under the commercial name STY-RODUR®;
- a $2^{nd}$ comparative polyurethane foam commercialized by the company SOPREMA under the commercial name EFIGREEN® ALU+ from which the outer aluminum film has been removed, in order to keep only the polyurethane core.

The tests have been carried out according to the standard ISO 844 Standard with a Preload: 50 N and Rate 10%/min.

Figure 5:
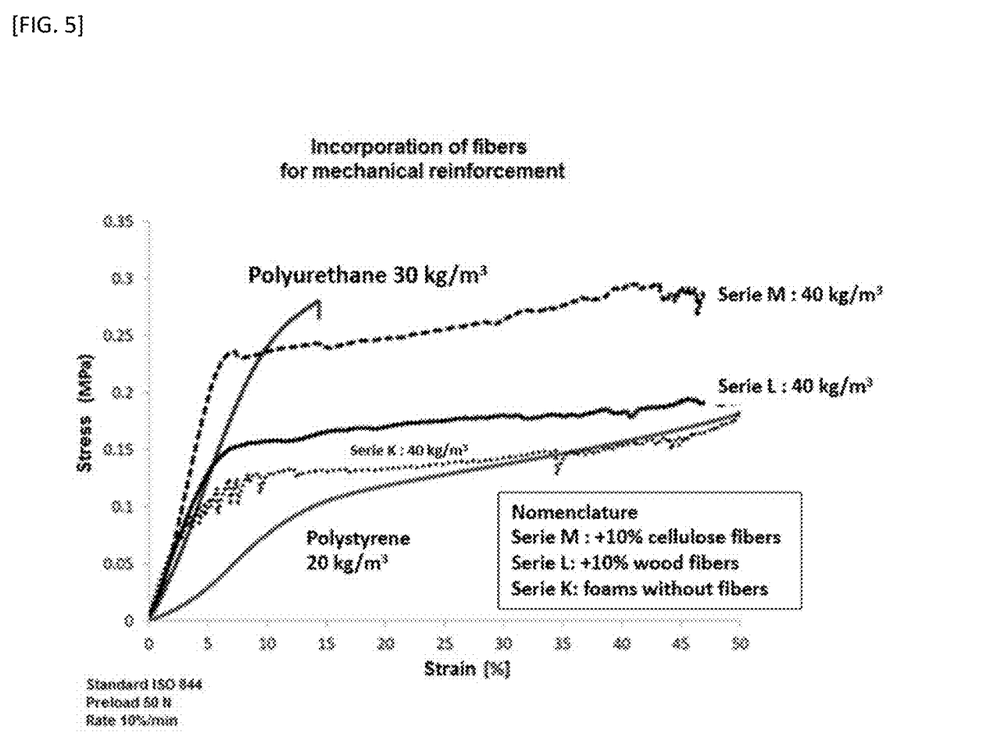
FIG. 5 represents a graph of the evolution of strain as a function of stress of five foams, three foams of the invention and two commercial foams (polyurethane foam and expanded polystyrene foam).

FIG. 5 represents a graph of the evolution of strain as a function of stress of the five foams.

These results show that the foams according to the invention have mechanical properties close to those of synthetic materials commonly used in heat-insulation of buildings.

Figure 6:
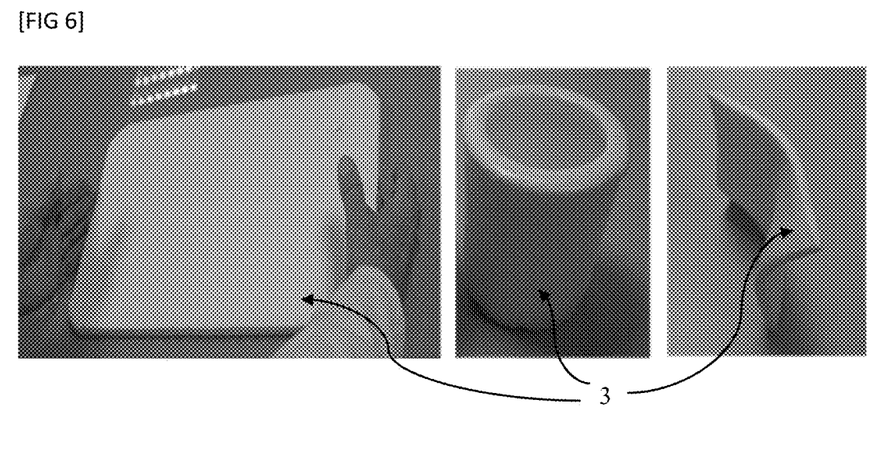
FIG. 6 represents a photograph of three objects made from a foam obtained with a production method according to the invention: planar plate, cylindrical pot and postformed plate.
Figure 7:
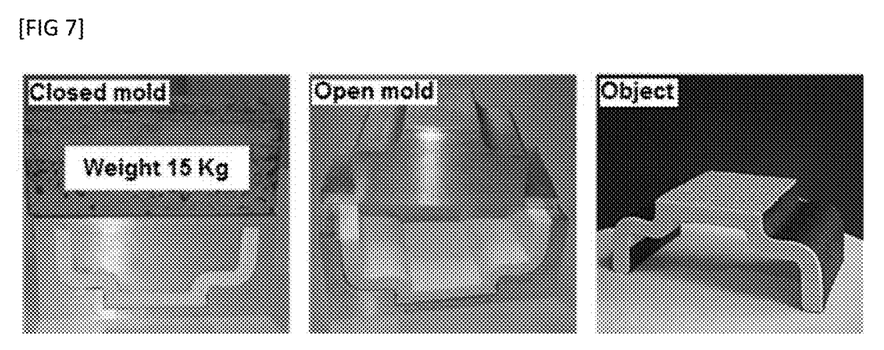
FIG. 7 represents a photograph of making of an object through a postforming operation.

The applications of a foam produced in this manner are illustrated in FIGS. 6 and 7 showing objects obtained from this foam. The planar plate and the cylindrical pot of FIG. 6 have been produced by casting the foam into suitable molds and then drying. The curved plate of FIG. 6 and the object of FIG. 7 have been produced by postforming of the foam; the obtained foam according to Example 3 is rehydrated to become soft again and then molded and dried.

The invention claimed is:

1. A method for producing an expanded rigid foam with sealed pores, wherein it comprises at least the following steps:
   a) a mixture is prepared containing at least:
   an anionic polymer suited for ionotropic gelation;
   a foaming agent;
   a source of multivalent cations, said multivalent cations not being released in the mixture a); and
   a solvent,
   b) the mixture is stirred so as to obtain a foam;
   c) at least one compound capable of releasing protons in a sufficient amount to release said multivalent cations is added to the foam obtained on completion of step b) such that the anionic polymer gels ionotropically;
   d) the foam obtained on completion of step c) is dried so as to obtain said expanded rigid foam with sealed pores.

2. The method according to claim 1, wherein the mixture a) comprises at least one selected from the group consisting of a sequestering agent, a stabilizing agent and a charge.

3. The method according to claim 1, wherein the anionic polymer suited for anionic gelation is a polymer that is naturally anionic or made anionic by chemical modification and is selected from the group consisting of alginates, kappa and iota carrageenans, pectins, starch and derivatives thereof, cellulose carboxymethyl, dextrane sulfate, xanthan, chondroitin sulfate, hyaluronate, N-acyl chitosans, acrylic polymers, methacrylic polymers, polylactic polymers, polyglycolic polymers, copolymers of acrylic and methacrylic acid, proteins and carbomers.

4. The method according to claim 1, wherein the foaming agent is selected from the group consisting of anionic surfactants and non-ionic surfactants.

5. The method according to claim 4, wherein the foaming agent is selected from the group consisting of sodium lauryl sulfate, ammonium lauryl sulfate, sodium stearate and sodium dodecylbenzenesulfonate and polysorbates.

6. The method according to claim 1, wherein the source of multivalent cations is selected from the group consisting of calcium carbonate, calcium sulfate, calcium citrate, calcium fluoride, calcium glycerophosphate, calcium hydroxide, calcium oxalate, dibasic calcium phosphate or calcium hydrogen phosphate, monobasic calcium phosphate, tribasic calcium phosphate, calcium pyrophosphate, calcium saccharate, calcium succinate, and calcium tartrate.

7. The method according to claim 1, wherein the solvent is selected from the group consisting of water and aqueous solvents.

8. The method according to claim 1, wherein the compound capable of releasing protons in a sufficient amount to solubilize the multivalent cations is selected from the group consisting of lactones of carboxylic acid and boric acid.

9. The method according to claim 2, wherein the sequestering agent is selected from the group consisting of sodium hexametaphosphate, polyphosphates, sodium or potassium phosphate, and trisodium phosphate.

10. The method according to claim 2, wherein the charge is selected from the group consisting of activated carbon, clays, silica, titanium dioxide, cork, plant barks and colorants.

11. The method according to claim 1, wherein at step b), at least one mechanical reinforcing agent which consists of fibers selected from the group consisting of cellulose, wood, hemp, silk, cotton, coco, textile and linen fibers is added to the mixture.

12. The method according to claim 1, wherein the mixture a) comprises, in weight percent expressed with respect to the total mass of said mixture:
- between 0.77% and 4.6% of the anionic polymer suited for ionotropic gelation;
- between 0.02% and 0.08% of the foaming agent;
- between 0.1% and 3% of the source of multivalent cations;
- q.s. 100% of solvent.

13. The method according to claim 2, wherein the mixture comprises in weight percent expressed with respect to the total mass of said mixture, between 0.00005% and 0.001% of the sequestering agent and/or 0.02% and 0.15% of the stabilizing agent and/or 0.05% and 8% of the charge.

14. The method according to claim 1, wherein, after step c) and before step d), the foam is casted into a mold.

15. The method according to claim 11, wherein the mixture comprises in weight percent expressed with respect to the total mass of said mixture, between 0.05% and 8% of the mechanical reinforcing agent.

* * * * *